(12) United States Patent
Casselton

(10) Patent No.: US 8,240,527 B1
(45) Date of Patent: Aug. 14, 2012

(54) EXTENDABLE TOOLBOX FOR A TRUCK BED AND ASSOCIATED METHOD

(76) Inventor: William Casselton, Sun City Center, FL (US)

( * ) Notice: Subject to any disclaimer, the term of this patent is extended or adjusted under 35 U.S.C. 154(b) by 292 days.

(21) Appl. No.: 12/653,517

(22) Filed: Dec. 15, 2009

(51) Int. Cl.
  *B60R 9/06* (2006.01)
  *B60R 7/02* (2006.01)

(52) U.S. Cl. ......... 224/404; 224/281; 224/487; 224/542

(58) Field of Classification Search .................. 224/403, 224/404, 281, 542, 487, 564; 296/26.09
  See application file for complete search history.

(56) References Cited

U.S. PATENT DOCUMENTS

| | | | | |
|---|---|---|---|---|
| 2,784,027 | A | * | 3/1957 | Temp ........................... 296/156 |
| 2,852,303 | A | | 9/1958 | Hopson |
| 4,705,315 | A | * | 11/1987 | Cherry ......................... 296/37.1 |
| 4,969,678 | A | * | 11/1990 | Loisel ......................... 296/24.33 |
| 5,090,335 | A | * | 2/1992 | Russell ........................... 108/44 |
| 5,575,521 | A | | 11/1996 | Speis |
| 5,816,637 | A | | 10/1998 | Adams |
| 6,318,781 | B1 | * | 11/2001 | Mc Kee ........................ 296/26.09 |
| D466,469 | S | * | 12/2002 | Nelson, Jr. .................... D12/221 |
| 6,860,536 | B1 | * | 3/2005 | Schimunek ................... 296/26.09 |
| 7,052,066 | B2 | * | 5/2006 | Emery et al. ................... 296/37.1 |
| 7,159,917 | B2 | * | 1/2007 | Haaberg ....................... 296/26.09 |
| 7,309,202 | B1 | * | 12/2007 | Anderson ........................ 414/537 |
| 7,530,618 | B2 | * | 5/2009 | Collins et al. ................. 296/37.6 |
| 7,628,439 | B1 | * | 12/2009 | Strong ......................... 296/26.03 |
| 2007/0246495 | A1 | * | 10/2007 | Hague ............................ 224/281 |

* cited by examiner

*Primary Examiner* — Justin Larson

(57) ABSTRACT

An extendable tool box includes a tool box, a table top and support legs. The tool box may be slidably reciprocated along a first horizontal travel path aligned parallel with the truck bed. The table top may be contiguously oriented parallel with the tool box and slidably reciprocated along a second horizontal travel path registered parallel to the first horizontal travel path. The tool box may include a bottom surface having a cavity whereby the table top may be stowed. A sliding mechanism may be connected to the bottom surface of the tool box and may permit the tool box to freely reciprocate along the first horizontal travel path. The support legs may be telescopically adjustable between extended and retracted positions. The tool box may include a plurality of storage compartments arranged on left and right longitudinal sides and equidistantly offset along a central longitudinal length of the tool box.

8 Claims, 7 Drawing Sheets

EXTENDABLE TOOLBOX FOR A TRUCK BED AND ASSOCIATED METHOD

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to vehicle tool boxes and, more particularly, to an extendable tool box for providing users with an easy and convenient means of accessing their tools and supplies on a truck bed without the need to climb into their truck bed.

2. Prior Art

With sales at an all-time high, the popularity of the pick-up style truck as an everyday vehicle is more wide spread than it ever has been. Their utility and convenience in hauling items coupled with the availability of luxury interiors and extended cab space have made the pickup a popular alternative to other vehicles. The availability of aftermarket accessories also enhances the attractiveness of pickup trucks as well. Perhaps one of the most common accessories is that of the "behind-the-cab" type toolbox, for carrying tools and other smaller objects.

However, accessing the toolbox is often a problem for many due to the height and depth limitations from only being able to reach the contents from the side of the truck. Many people are forced to climb up into the truck to reach the items located in the middle of the toolbox. In addition, the weight of some tools and the need to clamber up and down a truck bed may be difficult for persons who are not physically in good shape or older workers.

Accordingly, a need remains for an apparatus in order to overcome the above-noted shortcomings. The present invention satisfies such a need by providing an extendable toolbox that is convenient and easy to use, is durable yet lightweight in design, is versatile in its applications, and provides an easy and convenient means for users to access their tools and supplies on a truck bed without the need to climb onto their truck bed.

BRIEF SUMMARY OF THE INVENTION

In view of the foregoing background, it is therefore an object of the present invention to provide an apparatus for accessing tools and supplies on a truck bed. These and other objects, features, and advantages of the invention are provided by an extendable tool box.

The extendable tool box may include a tool box adapted to be positioned on a truck bed and slidably reciprocated along a first horizontal travel path adapted to be aligned parallel with the truck bed. A table top may be contiguously oriented parallel with the tool box and adapted to remain disposed above the truck bed and further be slidably reciprocated along a second horizontal travel path registered parallel to the first horizontal travel path. In this way, the tool box and the table top may be independently reciprocated along the first and second horizontal travel paths respectively. The tool box may further include a bottom surface preferably having a cavity extending from a proximal end and terminating at a distal end of the tool box respectively. A sliding mechanism may be connected to the bottom surface of the tool box and thereby permit the tool box to freely reciprocate along the first horizontal travel path. Such an arrangement provides the unexpected and unpredictable advantage of extracting and retracting the tool box and table top independently of each other. As an example, a user may extend the tool box from the truck bed for accessing his tools without having to extend the table top. He may only need to extend the table top for use thereby eliminating the use of precious space unless necessary.

The table top may be removably inserted into the cavity such that the table top may contiguously lay parallel with the bottom surface of the tool box. The tool box may further include a first group of support legs and a second group of support legs pivotally mated to a bottom surface of the table top. Each of the first and second support leg groups may further be selectively and independently pivotal between horizontal and vertical positions defined parallel and orthogonal to the first and second horizontal travel paths respectively. Such an arrangement provides the unexpected and unpredictable advantage of positioning the first and second groups of support legs within the cavity in stowed position and further allowing each group of support legs to be easily extended or retracted together with the tool box by a user.

The sliding mechanism may include a plurality of rectilinear roller tracks oriented parallel to each other and adapted to be statically mated to the truck bed. A plurality of rollers may be spacedly positioned along the roller tracks such that a plurality of roller axles may passed through the rollers and further be anchored to the outer walls of the roller tracks. A plurality of spacer blocks may further be statically mated to the bottom surface of the tool box and vertically aligned above the rollers such that the spacer blocks may engage the rollers and thereby travel along the roller tracks when the tool box is reciprocated along the first horizontal travel path. The sliding mechanism may further remain laterally spaced exterior of the cavity and aligned along left and right longitudinal sides of the tool box. Such an arrangement provides the unexpected and unpredictable advantage of allowing a user to easily extend or retract the heavy tool box with minimum effort by having the spacer blocks slide over the rollers smoothly.

The sliding mechanism may further include a plurality of pin sleeves formed through the spacer blocks and oriented parallel to the roller axles and a plurality of rectilinear pivot pins positioned through corresponding support legs of the first support leg group and the spacer blocks respectively. In this way, each of the corresponding support legs may be independently pivoted while each of the spacer block remains at a statically fixed position. The pivot pins may further be rotatably situated within the pin sleeves. Such an arrangement provides the unexpected and unpredictable advantage of using the spacer block as a sliding member as well as acting as a support structure for the tool box without having to add additional weight bearing structures to support the tool box.

In one embodiment, the tool box may further include a plurality of storage compartments arranged on left and right longitudinal sides of the tool box and equidistantly offset along a central longitudinal length of the tool box respectively. The table top may be situated subjacent to the storage compartments. Such an arrangement provides the unexpected and unpredictable advantage of distributing similar contents of the tool box into specific compartments for easy retrieval and further allows for a balanced distribution of weight to the entire tool box such that the tool box may be extracted and retracted with ease by any user.

In one embodiment, the first and second support leg groups may be telescopically adjustable between extended and retracted positions respectively. The support legs may include an outer leg tube and an inner leg tube. A spring lock clip may further be used to lock the outer and inner leg tubes statically when in extended position. Such a space saving arrangement provides the unexpected and unpredicted advantage of optimizing the usage of limited space within the cavity when stowing the support leg groups.

The invention may further include a method of utilizing an extendable tool box for accessing tools and supplies on a truck bed. Such a method may include the chronological steps of: providing and positioning a tool box on a truck bed; providing and aligning the tool box parallel with the truck bed by slidably reciprocating the tool box along a first horizontal travel path; providing and contiguously orienting a table top parallel with the tool box such that the table top remains disposed above the truck bed; providing and slidably reciprocating the table top along a second horizontal travel path registered parallel to the first horizontal travel path; and providing and independently reciprocating the tool box and the table top along the first and second horizontal travel paths respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1:
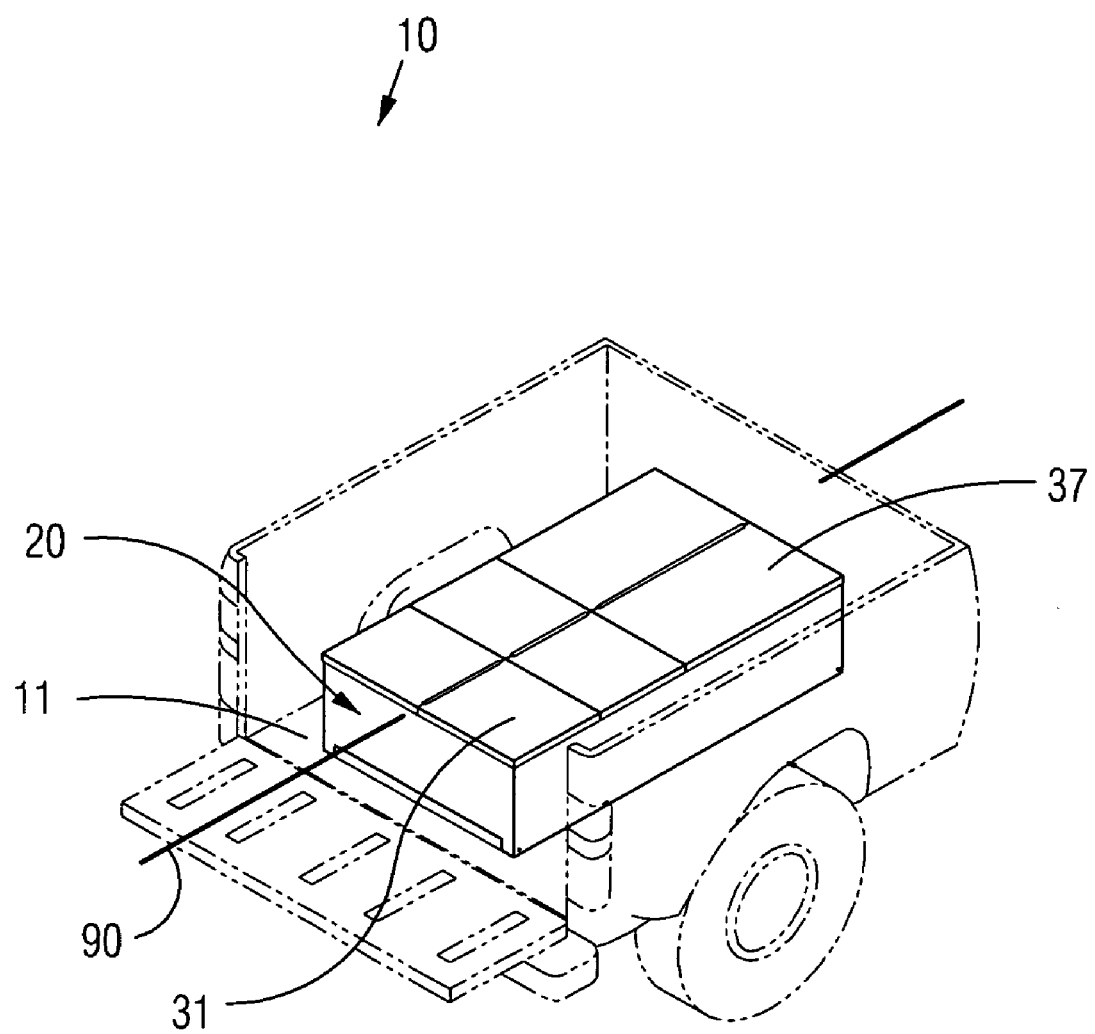
FIG. 1 is a perspective view showing an extendable tool box at a stowed position, in accordance with the present invention.
Figure 2:
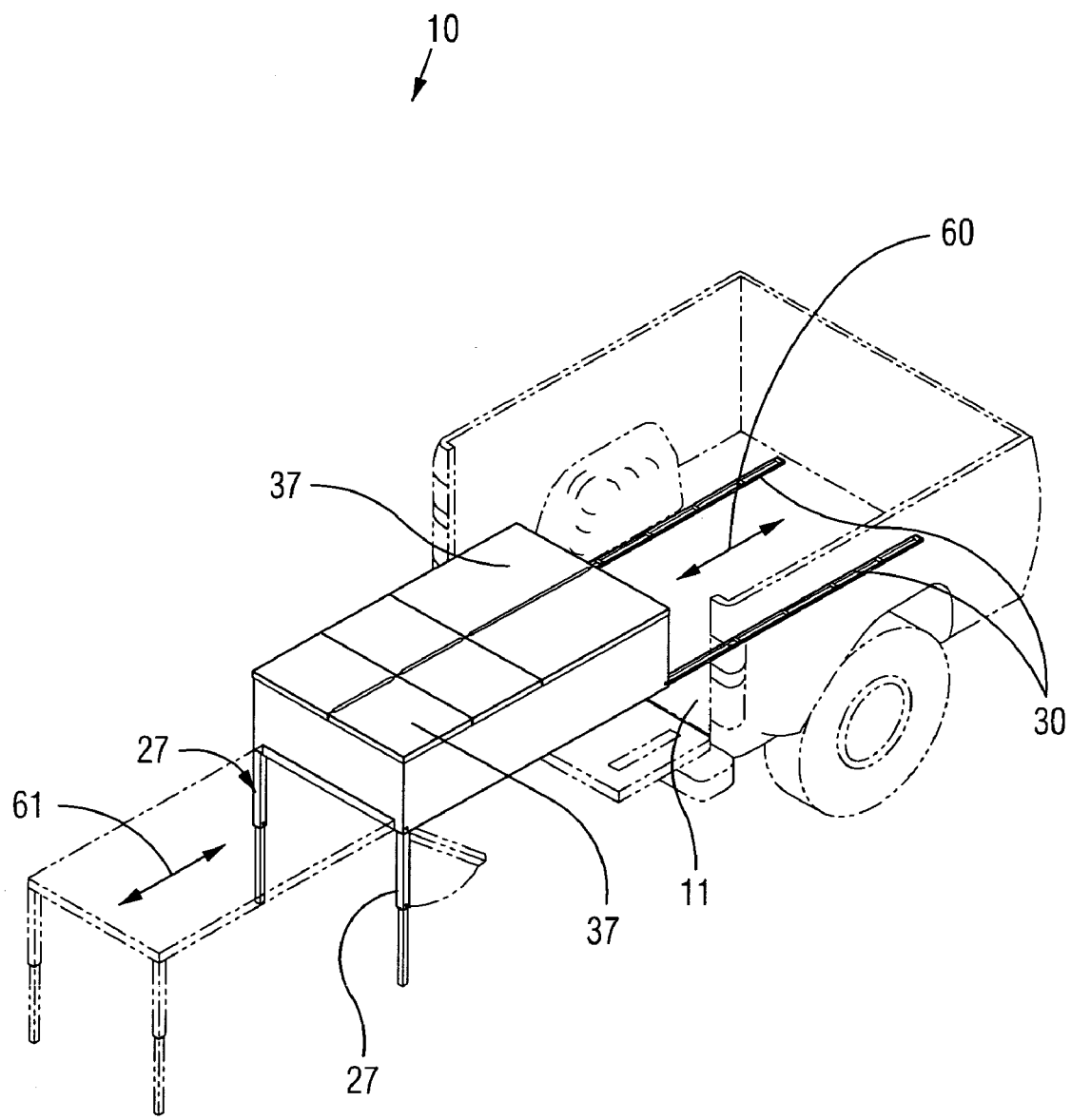
FIG. 2 is a perspective view showing the tool box at an extended position.
Figure 3:
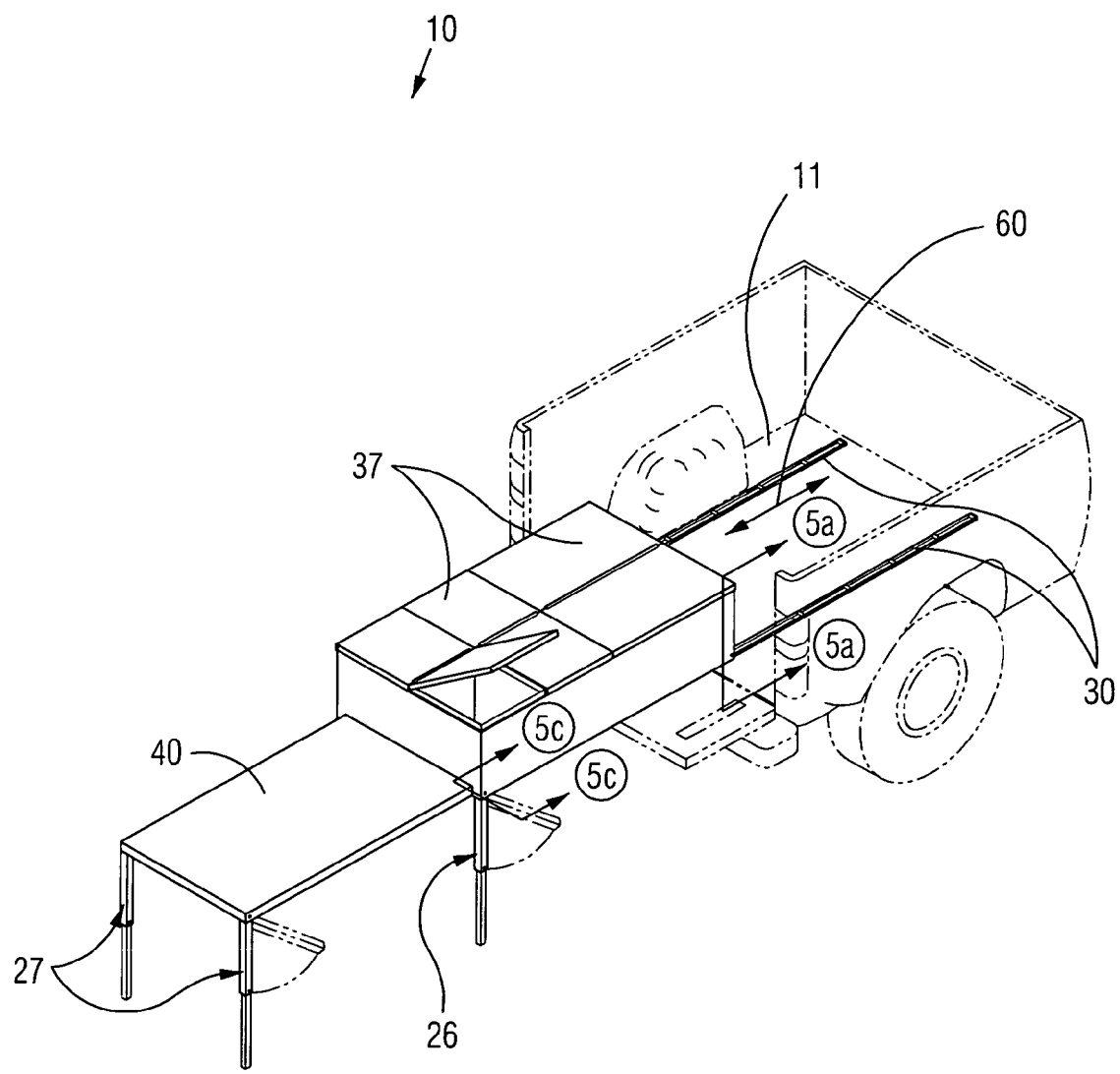
FIG. 3 is a perspective view showing the tool box and the table top at extended positions respectively.
Figure 4:
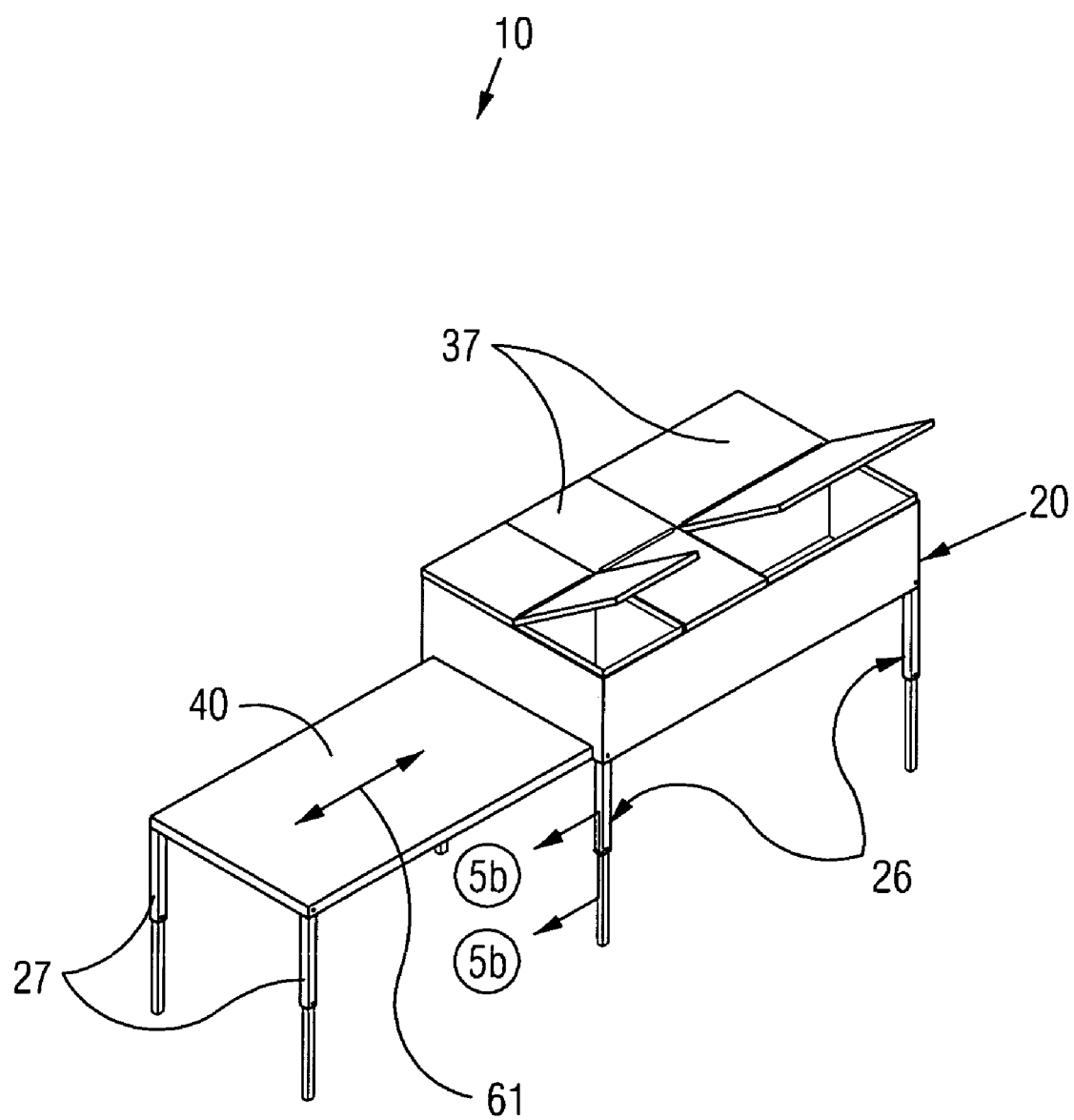
FIG. 4 is a perspective view showing the tool box and the table top at a standing position and fully removed from the truck bed.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-7 by the reference numeral 10 and is intended to provide an extendable tool box. It should be understood that the extendable tool box 10 may be used to store and access tools and supplies on a truck bed and other different types of vehicles having recessed niches.

Referring generally to FIGS. 1-7, the extendable tool box 10 may include a tool box 20 adapted to be positioned on a truck bed 11 and slidably reciprocated along a first horizontal travel path 60 adapted to be aligned parallel with the truck bed 11. A table top 40 may be contiguously oriented parallel with the tool box 20 and adapted to remain disposed above the truck bed 11 and further be slidably reciprocated along a second horizontal travel path 61 registered parallel to the first horizontal travel path 60. In this way, the tool box 20 and the table top 40 may be independently reciprocated along the first and second horizontal travel paths 60, 61 respectively.

Figure 5A:
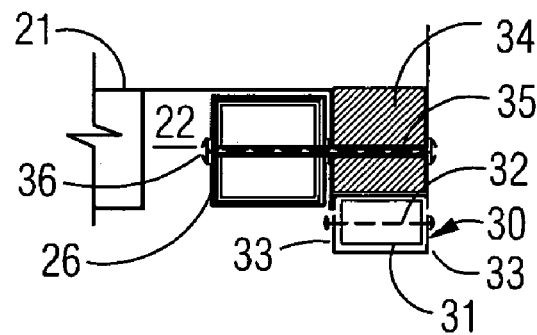
FIG. 5a is an enlarged cross-sectional view, taken along line 5a-5a shown in FIG. 3, of the sliding mechanism.
Figure 5B:
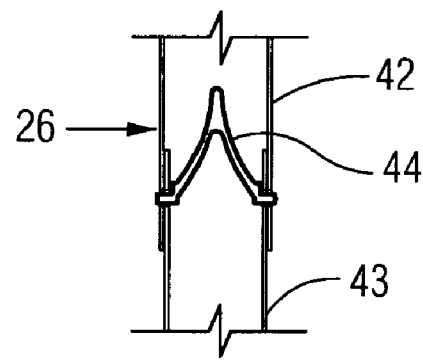
FIG. 5b is an enlarged cross-sectional view, taken along line 5b-5b shown in FIG. 4, of the support leg.
Figure 5C:
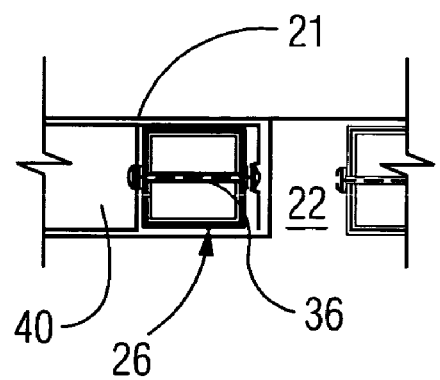
FIG. 5c is an enlarged cross-sectional view, taken along line 5c-5c shown in FIG. 3, showing the second support leg group at a retracted position.
Figure 7:
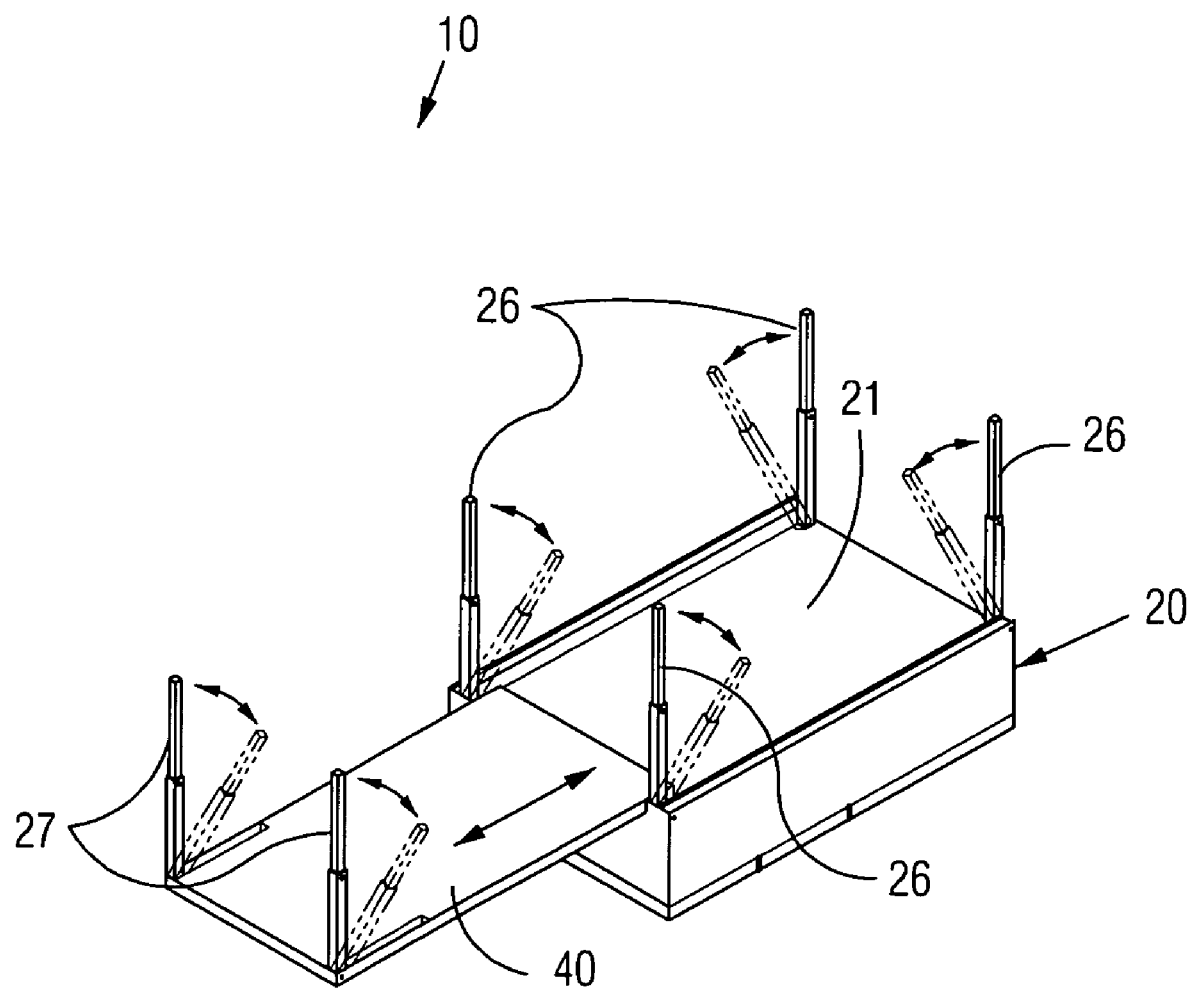
FIG. 7 is a perspective view showing the bottom of the toolbox and table top.

As best shown in FIGS. 5a, 5c and 7, the tool box 20 may further include a bottom surface 21 preferably having a cavity 22 extending from a proximal end and terminating at a distal end of the tool box 20, respectively. A sliding mechanism 25 may be connected to the bottom surface 21 of the tool box 20 and thereby permit the tool box 20 to freely reciprocate along the first horizontal travel path 60. Such an arrangement provides the unexpected and unpredictable advantage of extracting and retracting the tool box 20 and table top 40 independently of each other. As an example, a user may extend the tool box 20 from the truck bed 11 for accessing his tools without having to extend the table top 40. The user may only need to extend the table top 40 for use thereby eliminating the need to separately store the tool box 20 and table top 40.

Figure 6:
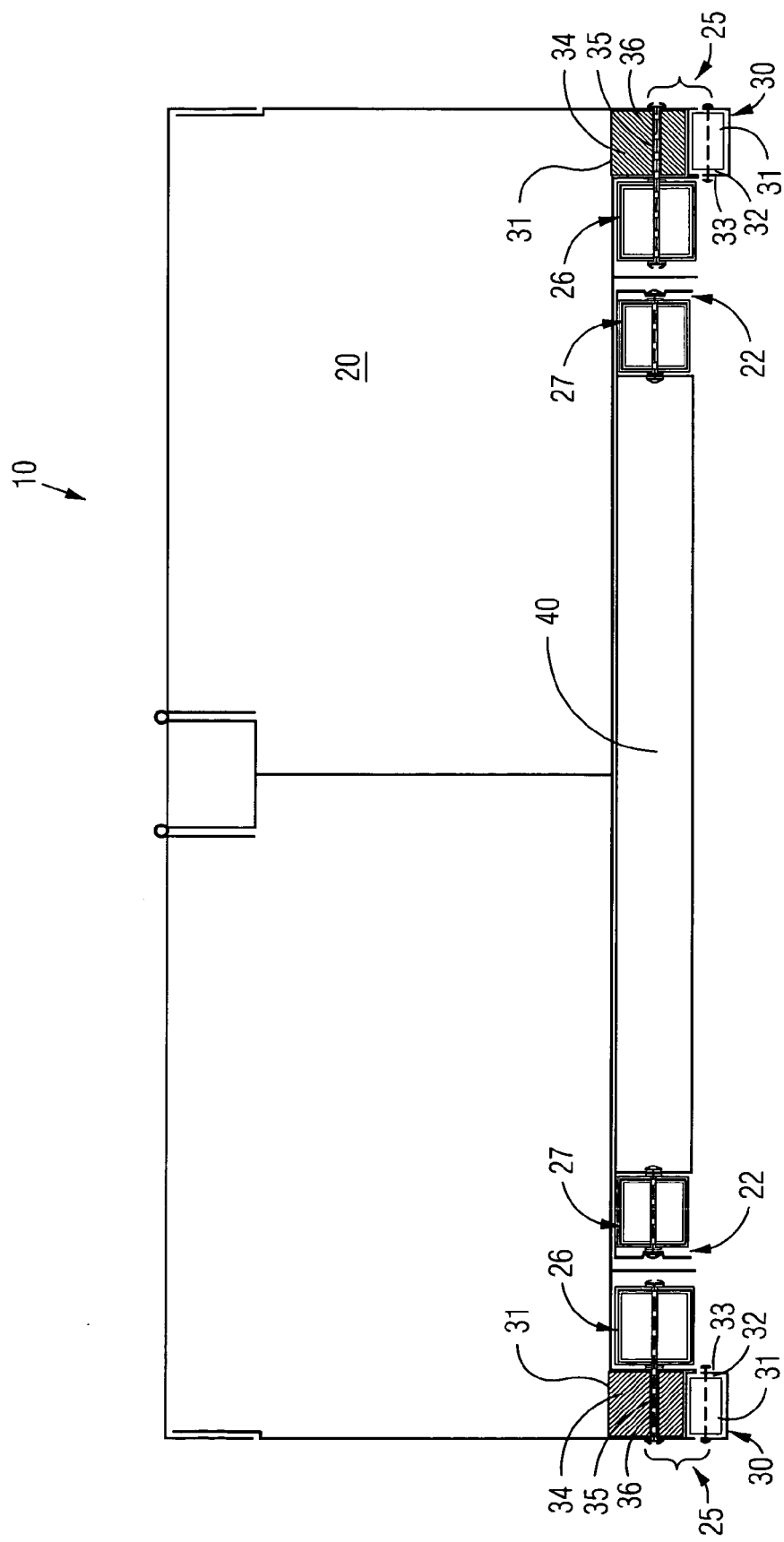
FIG. 6 is a cross-sectional view showing the respective positions of the sliding mechanism and support leg groups in relation to the bottom surface of the tool box and the table top.

Referring to FIGS. 2, 4, 6 and 7, the table top 40 may be removably inserted into the cavity 22 such that the table top 40 may contiguously lay parallel with the bottom surface 21 of the tool box 20. As best shown in FIG. 6, the tool box 20 may further include a first group of support legs 26 and a second group of support legs 27 pivotally mated to a bottom surface 21 of the table top 40. Each of the first and second support leg groups 26, 27 may be selectively and independently pivotal between horizontal and vertical positions defined parallel and orthogonal to the first and second horizontal travel paths 60, 61, respectively. Such an arrangement provides the unexpected and unpredictable advantage of positioning the first and second groups of support legs 26, 27 within the cavity 22 in stowed positions and further allows each group of support legs 26, 27 to be easily extended or retracted together with the tool box 20.

Referring to FIGS. 2, 3, 5a, 5c and 6, the sliding mechanism 25 may include a plurality of rectilinear roller tracks 30 oriented parallel to each other and adapted to be statically mated to the truck bed 11. A plurality of rollers 31 may be spacedly positioned along the roller tracks 30. A plurality of roller axles 32 pass through the rollers 31 and remain anchored to the outer walls 33 of the roller tracks 30. A plurality of spacer blocks 34 may be statically mated to the bottom surface 21 of the tool box 20 and vertically aligned above the rollers 31 such that the spacer blocks 34 engage the rollers 31 and thereby travel along the roller tracks 30 when the tool box 20 is reciprocated along the first horizontal travel path 60. The sliding mechanism 25 may further remain laterally spaced exterior of the cavity 22 and aligned along left and right longitudinal sides of the tool box 20. Such an arrangement provides the unexpected and unpredictable advantage of allowing a user to easily extend or retract the heavy tool box 20 with minimal effort by having the spacer blocks 34 smoothly slide over the rollers 31.

Referring to FIGS. 5a, 5b, 5c and 6, the sliding mechanism 25 may further include a plurality of pin sleeves 35 formed through the spacer blocks 34 and oriented parallel to the roller axles 32, and a plurality of rectilinear pivot pins 36 positioned through corresponding support legs 41 of the first support leg group 26 and the spacer blocks 34, respectively. In this way, each of the corresponding support legs 26 may be independently pivoted while each of the spacer blocks 34 remain at a statically fixed position. The pivot pins 36 may further be rotatably situated within the pin sleeves 35. Such an arrangement provides the unexpected and unpredictable advantage of using the spacer block 34 as a sliding member as well as acting as a support structure for the tool box 20 without having to add additional weight bearing structures to support the tool box 20.

Referring again to FIGS. 1-4, the tool box 20 may further include a plurality of storage compartments 37 arranged on left and right longitudinal sides 38 of the tool box 20 and equidistantly offset along a central longitudinal axis 90 of the tool box 20 respectively. The table top 40 may be situated subjacent to the storage compartments 37. Such an arrangement provides the unexpected and unpredictable advantage of distributing similar contents of the tool box 20 into specific compartments for easy retrieval and further allows for a balanced distribution of weight to the entire tool box 20 such that the tool box 20 may be extracted and retracted with ease.

Referring to FIG. 5b, the first and second support leg groups 26, 27 may be telescopically adjustable between extended and retracted positions respectively. The support legs 41 may include an outer leg tube 42 and an inner leg tube 43. A spring lock clip 44 may further be used to lock the outer and inner leg tubes 42, 43 statically in extended position. Such a space saving arrangement provides the unexpected and unpredicted advantage of optimizing the usage of limited space within the cavity 22 when stowing the support leg groups 26, 27.

The invention may further include a method of utilizing an extendable tool box 10 for accessing tools and supplies on a truck bed 11. Such a method may include the chronological steps of: providing and positioning a tool box 20 on a truck bed 11; providing and aligning the tool box 20 parallel with the truck bed 11 by slidably reciprocating the tool box 20 along a first horizontal travel path 60; providing and contiguously orienting a table top 40 parallel with the tool box 20 such that the table top 40 remains disposed above the truck bed 11; providing and slidably reciprocating the table top 40 along a second horizontal travel path 61 registered parallel to the first horizontal travel path 60; and providing and independently reciprocating the tool box 20 and the table top 40 along the first and second horizontal travel path 61s respectively.

The combination of such claimed elements as provides an unpredictable and unexpected benefit of using an extendable tool box to be mounted on the bed of a truck. This may solve the problem of having to use a variety of tool boxes for storing different tools and working materials for use especially at outdoor work sites where a quick retrieval and stowage of these tools and supplies may be needed. The invention saves time and effort for the user and thus results in higher productivity.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An extendable tool box for accessing tools and supplies on a truck bed, said extendable tool box comprising:
   a tool box adapted to be positioned on the truck bed, said tool box being slidably reciprocated along a first horizontal travel path and thereby adapted to be aligned parallel with the truck bed; and
   a table top contiguously oriented parallel with said tool box and thereby adapted to remain disposed above the truck bed, said table top being slidably reciprocated along a second horizontal travel path registered parallel to said first horizontal travel path;
   wherein said tool box comprises:
   a bottom surface having a cavity extending from a proximal end of said tool box and terminating at a distal end of said tool box;
   a sliding mechanism connected to said bottom surface of said tool box and thereby permitting said tool box to freely reciprocate along said first horizontal travel path; and
   a first group of support legs pivotally mated to said bottom surface of said tool box;
   wherein said table top is removably inserted into said cavity such that said table top contiguously lays parallel with said bottom surface of said tool box, said table top further including a second group of support legs pivotally mated to a bottom surface of said table top;
   wherein each of said first and second support leg groups are selectively and independently pivotal between horizontal and vertical positions defined parallel and orthogonal to said first and second horizontal travel paths respectively;

wherein said sliding mechanism comprises:
a plurality of rectilinear roller tracks oriented parallel to each other and adapted to be statically mated to the truck bed;
a plurality of rollers spacedly positioned along said roller tracks respectively;
a plurality of roller axles passed through said rollers and anchored to outer walls of said roller tracks respectively; and
a plurality of spacer blocks statically mated to said bottom surface of said tool box and vertically aligned above said rollers respectively;
wherein said spacer blocks engage said rollers and thereby travel along said roller tracks when said tool box is reciprocated along said first horizontal travel path;
wherein said sliding mechanism remains laterally spaced exterior of said cavity and aligned along left and right longitudinal sides of said tool box;
wherein said sliding mechanism further comprises:
a plurality of pin sleeves formed through said spacer blocks and oriented parallel to said roller axles respectively; and
a plurality of rectilinear pivot pins positioned through corresponding support legs of said first support leg group and said spacer blocks respectively such that each said corresponding support leg independently pivots while each said spacer block remains at a statically fixed position respectively.

2. The extendable tool box of claim 1, wherein said pivot pins are rotatably situated within said pin sleeves respectively.

3. The extendable tool box of claim 1, wherein said tool box further comprises:
a plurality of storage compartments arranged on left and right longitudinal sides of said tool box and equidistantly offset along a central longitudinal axis of said tool box respectively;
wherein said table top is situated subjacent to said storage compartments.

4. The extendable tool box of claim 1, wherein said first and second support leg groups are telescopically adjustable between extended and retracted positions respectively.

5. An extendable tool box for accessing tools and supplies on a truck bed, said extendable tool box comprising:
a tool box adapted to be positioned on the truck bed, said tool box being slidably reciprocated along a first horizontal travel path and thereby adapted to be aligned parallel with the truck bed; and
a table top contiguously oriented parallel with said tool box and thereby adapted to remain disposed above the truck bed, said table top being slidably reciprocated along a second horizontal travel path registered parallel to said first horizontal travel path;
wherein said tool box and said table top are independently reciprocated along said first and second horizontal travel paths;
wherein said tool box comprises:
a bottom surface having a cavity extending from a proximal end of said tool box and terminating at a distal end of said tool box;

a sliding mechanism connected to said bottom surface of said tool box and thereby permitting said tool box to freely reciprocate along said first horizontal travel path; and
a first group of support legs pivotally mated to said bottom surface of said tool box;
wherein said table top is removably inserted into said cavity such that said table top contiguously lays parallel with said bottom surface of said tool box; and
a second group of support legs pivotally mated to a bottom surface of said table top;
wherein each of said first and second support leg groups are selectively and independently pivotal between horizontal and vertical positions defined parallel and orthogonal to said first and second horizontal travel paths respectively;
wherein said sliding mechanism comprises:
a plurality of rectilinear roller tracks oriented parallel to each other and adapted to be statically mated to the truck bed;
a plurality of rollers spacedly positioned along said roller tracks respectively;
a plurality of roller axles passed through said rollers and anchored to outer walls of said roller tracks respectively; and
a plurality of spacer blocks statically mated to said bottom surface of said tool box and vertically aligned above said rollers respectively;
wherein said spacer blocks engage said rollers and thereby travel along said roller tracks when said tool box is reciprocated along said first horizontal travel path;
wherein said sliding mechanism remains laterally spaced exterior of said cavity and aligned along left and right longitudinal sides of said tool box;
wherein said sliding mechanism further comprises:
a plurality of pin sleeves formed through said spacer blocks and oriented parallel to said roller axles respectively; and
a plurality of rectilinear pivot pins positioned through corresponding support legs of said first support leg group and said spacer blocks respectively such that each said corresponding support leg independently pivots while each said spacer block remains at a statically fixed position respectively.

6. The extendable tool box of claim 5, wherein said pivot pins are rotatably situated within said pin sleeves respectively.

7. The extendable tool box of claim 5, wherein said tool box further comprises:
a plurality of storage compartments arranged on left and right longitudinal sides of said tool box and equidistantly offset along a central longitudinal axis of said tool box respectively;
wherein said table top is situated subjacent to said storage compartments.

8. The extendable tool box of claim 5, wherein said first and second support leg groups are telescopically adjustable between extended and retracted positions respectively.

* * * * *